(12) United States Patent
Yamada

(10) Patent No.: US 12,089,783 B2
(45) Date of Patent: Sep. 17, 2024

(54) FRYER

(71) Applicant: COOL FRYER CO., LTD., Yokohama (JP)

(72) Inventor: Koji Yamada, Yokohama (JP)

(73) Assignee: COOL FRYER CO., LTD., Yokohama (JP)

( * ) Notice: Subject to any disclaimer, the term of this patent is extended or adjusted under 35 U.S.C. 154(b) by 723 days.

(21) Appl. No.: 17/297,785

(22) PCT Filed: Nov. 8, 2019

(86) PCT No.: PCT/JP2019/043980
§ 371 (c)(1),
(2) Date: May 27, 2021

(87) PCT Pub. No.: WO2020/110669
PCT Pub. Date: Jun. 4, 2020

(65) Prior Publication Data
US 2022/0047117 A1 Feb. 17, 2022

(30) Foreign Application Priority Data
Nov. 28, 2018 (JP) ................. 2018-222264

(51) Int. Cl.
*A47J 37/12* (2006.01)
(52) U.S. Cl.
CPC ....... *A47J 37/1261* (2013.01); *A47J 37/1266* (2013.01)
(58) Field of Classification Search
CPC ........................ A47J 37/1261; A47J 37/1266
(Continued)

(56) References Cited

U.S. PATENT DOCUMENTS 2,753,436 A * 7/1956 Schwaneke ......... A47J 37/1209
99/403
2,906,850 A * 9/1959 Meletio .................. A47J 27/14
99/357
(Continued)

FOREIGN PATENT DOCUMENTS

JP 2008220594 A * 9/2008 .......... A47J 37/1266
JP 4262999 B2 * 5/2009 .......... A47J 37/1242
(Continued)

OTHER PUBLICATIONS

International Search Report dated Jan. 1, 2020, issued in counterpart International Application No. PCT/JP2019/043980. (2 pages).
(Continued)

*Primary Examiner* — Eric S Stapleton
(74) *Attorney, Agent, or Firm* — WHDA, LLP

(57) ABSTRACT

A fryer includes: an oil tank; and a heater, the fryer being configured to heat a frying oil stored in the oil tank by the heater so as to fry a food material put into the oil tank, the oil tank including an upper oil tank in which the heater is arranged and the food material is to be fried, and a lower oil tank provided below the upper oil tank so as to be continuous with the upper oil tank, and configured to sink and collect moisture and fried scraps released from the food material into the upper oil tank, the heater including a side heater partitioning an inside of the upper oil tank into one or a plurality of cooking areas, and surrounding the one or the plurality of cooking areas, and a lower heater provided at a bottom of the one or the plurality of cooking areas.

2 Claims, 8 Drawing Sheets

(58) Field of Classification Search
USPC .......................................................... 99/403
See application file for complete search history.

(56) References Cited

U.S. PATENT DOCUMENTS

| | | | | |
|---|---|---|---|---|
| 3,633,490 | A * | 1/1972 | Schiffmann | A47J 37/1214 99/405 |
| 4,282,423 | A * | 8/1981 | Volz | A47J 37/1266 219/442 |
| 4,798,939 | A * | 1/1989 | Nett | A47J 27/086 219/415 |
| 4,848,317 | A * | 7/1989 | Prudhomme | A47J 37/1247 99/403 |
| 4,898,151 | A * | 2/1990 | Luebke | A47J 37/1247 219/400 |
| 5,253,566 | A * | 10/1993 | McCabe | A47J 37/1247 126/92 AC |
| 5,341,728 | A * | 8/1994 | Ejiri | A47J 37/1266 99/344 |
| 5,379,683 | A * | 1/1995 | Ejiri | A47J 37/1266 219/442 |
| 5,471,911 | A * | 12/1995 | Minari | A47J 37/1266 99/403 |
| 5,598,767 | A * | 2/1997 | Minari | A47J 37/1266 99/332 |
| 5,601,011 | A * | 2/1997 | Minari | A47J 37/1266 99/403 |
| 5,662,025 | A * | 9/1997 | Yoo | A47J 27/004 219/448.11 |
| 6,095,037 | A * | 8/2000 | Savage | A47J 37/1247 210/DIG. 8 |
| 6,240,835 | B1 * | 6/2001 | Bois | A47J 37/1266 99/336 |
| 7,141,764 | B1 * | 11/2006 | Shumate | A47J 37/1261 219/439 |
| 8,522,671 | B2 * | 9/2013 | Jones | A47J 37/1295 99/410 |
| 2003/0127451 | A1 * | 7/2003 | Lile | A47J 37/06 219/506 |
| 2007/0028781 | A1 * | 2/2007 | Popeil | A47J 37/129 99/407 |
| 2009/0013877 | A1 * | 1/2009 | Lackman | A47J 37/129 220/573.1 |
| 2009/0084273 | A1 * | 4/2009 | Lackman | A47J 37/1223 99/408 |
| 2009/0107344 | A1 * | 4/2009 | Bivens | A47J 37/1223 210/167.28 |
| 2009/0120303 | A1 * | 5/2009 | Popeil | A47J 37/1219 99/403 |
| 2010/0173159 | A1 * | 7/2010 | Takashi | C11B 5/00 428/404 |
| 2010/0212510 | A1 * | 8/2010 | Hutson | A47J 37/129 700/275 |
| 2010/0212691 | A1 * | 8/2010 | Hutson | B08B 3/14 134/10 |
| 2010/0269712 | A1 * | 10/2010 | Popeil | A47J 37/1209 99/403 |
| 2014/0020568 | A1 * | 1/2014 | Huang | F28F 13/08 99/403 |
| 2014/0227411 | A1 * | 8/2014 | Popeil | A47J 37/1209 220/573.1 |
| 2014/0356496 | A1 * | 12/2014 | Melnyczuk | A23B 7/0205 426/523 |
| 2015/0272390 | A1 * | 10/2015 | Burns | A47J 37/1266 99/330 |
| 2018/0160853 | A1 * | 6/2018 | Miyoshi | A47J 37/1219 |
| 2022/0047117 | A1 * | 2/2022 | Yamada | A47J 37/1261 |
| 2023/0210306 | A1 * | 7/2023 | Yamada | A47J 37/1261 99/403 |

FOREIGN PATENT DOCUMENTS

| | | | | |
|---|---|---|---|---|
| JP | 2010-294 A | | 1/2010 | |
| JP | 2015172447 A | * | 10/2015 | .......... A47J 37/1266 |
| JP | 5901624 B2 | | 4/2016 | |
| JP | 6252810 B1 | * | 12/2017 | .......... A47J 37/1266 |
| JP | 2018-50985 A | | 4/2018 | |
| JP | 2018-93905 A | | 6/2018 | |
| KR | 100861869 B1 | | 10/2008 | |
| WO | WO-2013039007 A1 | * | 3/2013 | .......... A47J 37/1266 |
| WO | WO-2018061307 A1 | * | 4/2018 | .......... A47J 37/1242 |

OTHER PUBLICATIONS

Non-Final Office Action dated Mar. 28, 2024, issued in U.S. Appl. No. 18/120,711 (17 pages).

* cited by examiner

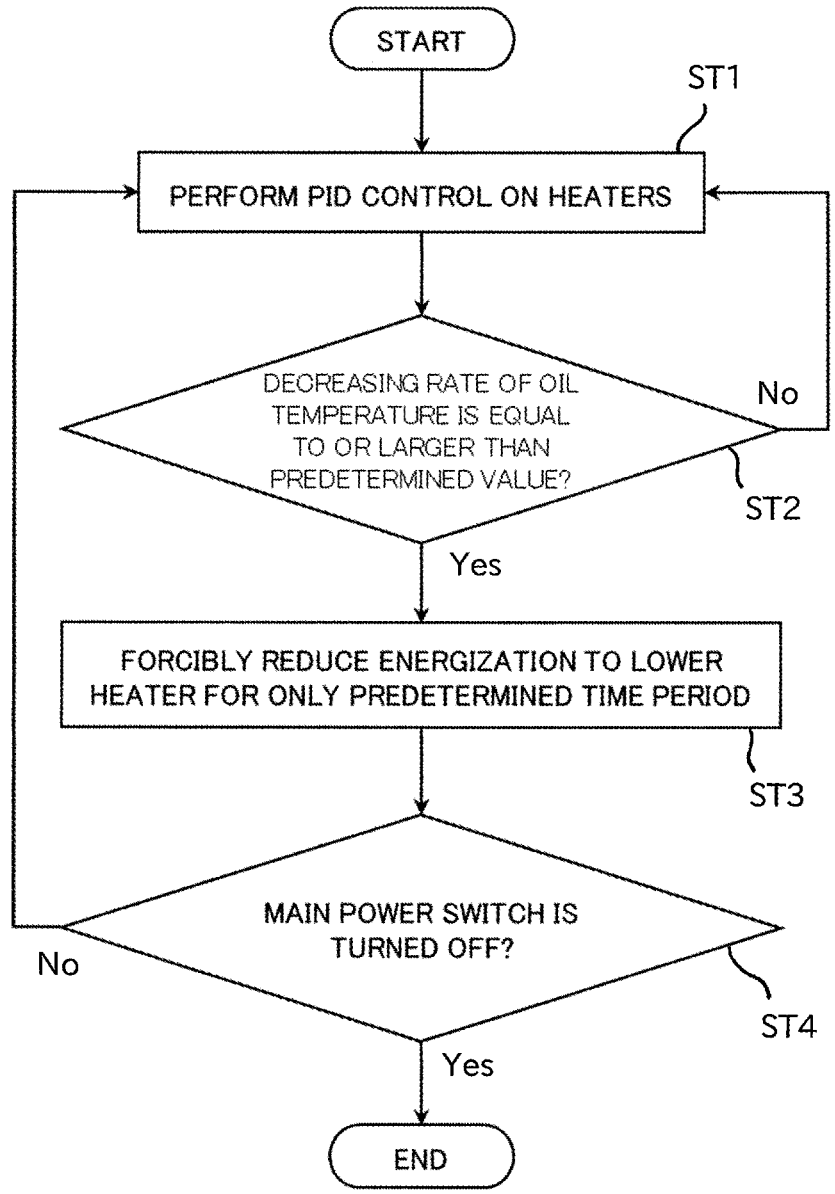

FRYER

TECHNICAL FIELD

The present invention relates to a fryer to be used for cooking fried food, and more particularly, to a fryer including a heater provided in a middle of an oil tank in a depth direction of the oil tank and configured to heat a frying oil.

BACKGROUND ART

Hitherto, as the fryer of this type, there is known a fryer including an oil tank configured to store a frying oil therein, and a heater arranged in a middle of the oil tank in a depth direction of the oil tank. An upper oil tank above the heater is provided as a high-temperature section, and fried food is cooked in the upper oil tank. Meanwhile, a lower oil tank below the heater is provided as a low-temperature section, and moisture and fried scraps formed in the oil during cooking of fried food are sunken into the lower oil tank.

As specific means for keeping the lower oil tank at low temperature, in a fryer as disclosed in Patent Literature 1, a heater is provided in a middle of an oil tank in a depth direction of the oil tank, and a perforated plate is provided so as to cover the heater from above. The perforated plate has a large number of small holes, and the frying oil flows in a subdivided manner between the upper oil tank and the lower oil tank through these small holes. That is, at the beginning of putting a food material into the upper oil tank, even when the frying oil in the upper oil tank is boiled due to vaporization of moisture released from the food material, owing to the presence of the perforated plate, the frying oil in the upper oil tank and the lower oil tank is not sharply agitated. With this configuration, it is intended to keep the lower oil tank at low temperature.

Meanwhile, in Patent Literature 2, there is proposed a fryer including a water tank provided to cover the entire lower oil tank from an outside of the lower oil tank, to thereby forcibly cool the frying oil in the lower oil tank. The oil in the upper oil tank is controlled to a temperature suitable for cooking fried food, whereas a temperature of the oil in the lower oil tank is kept at about 80° C. In Patent Literature 2, as effects of keeping the temperature of the oil in the lower oil tank at about 80° C., the following points are described: vaporization of moisture sunken into the lower oil tank is prevented so that deterioration of the frying oil due to oxidation and oil spatter in the upper oil tank are suppressed; and there is prevented a trouble in that the fried scraps once sunken into the lower oil tank are raised into the upper oil tank by convection, and adhere to fried food.

CITATION LIST

Patent Literature

[PTL 1] JP 2010-000294 A
[PTL 2] JP 5901624 B

DISCLOSURE OF THE INVENTION

Problems to be Solved by Invention

In the fryer as described in each of Patent Literature 1 and Patent Literature 2, the frying oil is heated by only the heater provided in the middle of the oil tank in the depth direction of the oil tank, and hence the heater has been required to generate a significant amount of heat. Thus, the moisture released into the frying oil from the food material put into the upper oil tank has inevitably passed through a vicinity of the heater having a large amount of heat generation in the process of being sunken into the lower oil tank kept at low temperature. That is, the moisture in the frying oil has been vaporized in the process of being sunken from the upper oil tank kept at high temperature into the lower oil tank kept at low temperature, thereby causing oil spatter on an oil surface in the upper oil tank, and deterioration of the frying oil due to oxidation.

Means for Solving the Problems

The present invention has been made in view of the problems described above, and has an object to provide a fryer capable of quickening precipitation of, into a lower oil tank, moisture and fried scraps released from a food material into a frying oil, thereby suppressing oil spatter on an oil surface and deterioration of the frying oil.

That is, according to the present invention, there is provided a fryer, including: an oil tank; and a heater, the fryer being configured to heat a frying oil stored in the oil tank by the heater so as to fry a food material put into the oil tank, the oil tank including an upper oil tank in which the heater is arranged and the food material is to be fried, and a lower oil tank provided below the upper oil tank so as to be continuous with the upper oil tank, and configured to sink and collect moisture and fried scraps released from the food material into the upper oil tank. Further, the heater includes a side heater partitioning an inside of the upper oil tank into one or a plurality of cooking areas, and surrounding the one or plurality of cooking areas, and a lower heater provided at a bottom of the one or plurality of cooking areas.

Effects of the Invention

According to the present invention, the frying oil in the upper oil tank, in which the food material is to be fried, is heated by both the side heater and the lower heater. The side heater partitions the inside of the upper oil tank into the one or a plurality of cooking areas, and surrounds the one or the plurality of cooking areas. The lower heater is provided at the bottom of the cooking areas. Thus, through use of the heaters, there can be quickened the sinking of, into the lower oil tank, the moisture and the fried scraps released from the food material into the frying oil, thereby being capable of suppressing oil spatter on the oil surface and deterioration of the frying oil.

BRIEF DESCRIPTION OF DRAWINGS

FIG. 10 is a flowchart for illustrating an example of energization control for the heaters.

MODE FOR CARRYING OUT THE INVENTION

Now, a fryer according to the present invention is described in detail with reference to the drawings.

Figure 1:
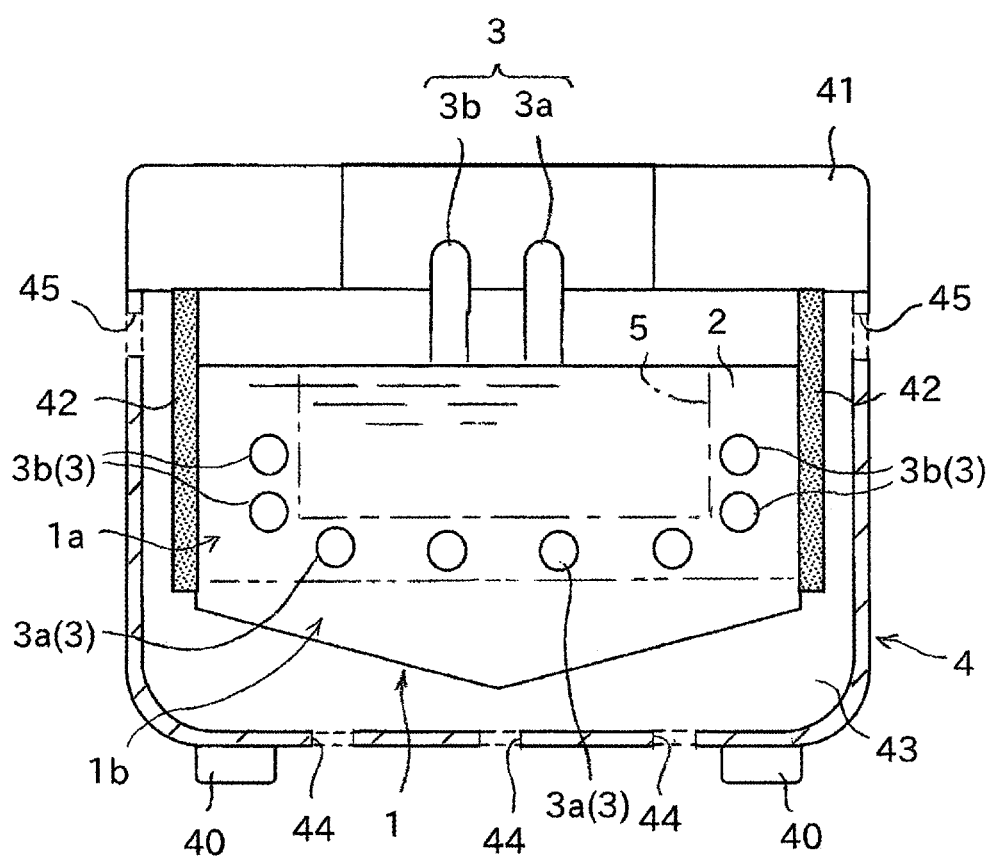
FIG. 1 is a sectional view for illustrating a fryer according to a first embodiment to which the present invention is applied.

FIG. 1 is a view for illustrating a fryer according to a first embodiment to which the present invention is applied. The fryer is a fryer of a tabletop type, and is configured to fry a food material in a frying oil 2 stored in an oil tank 1 by heating the frying oil 2 by heaters 3. The fryer includes a housing 4 and an operation unit 41. The housing 4 is formed into a substantially rectangular shape, and includes a plurality of leg portions 40 on a bottom of the housing 4. The operation unit 41 includes a main power switch, and is provided on an upper portion of the housing 4. Further, the operation unit 41 includes a liquid crystal display configured to indicate, for example, a current temperature of the frying oil. The oil tank 1 configured to store the frying oil 2 therein is provided at a center of the housing 4, and the heaters 3 extending from the operation unit 41 are inserted in the oil tank 1.

The oil tank 1 is roughly divided into an upper oil tank 1*a* and a lower oil tank 1*b*. In the upper oil tank 1*a*, the heaters 3 are arranged. The lower oil tank 1*b* is provided below the upper oil tank 1*a* so as to be continuous with the upper oil tank 1*a*. The heaters 3 are configured to heat the frying oil in the upper oil tank 1*a*, and the food material is fried in the upper oil tank 1*a*. Meanwhile, moisture and fried scraps, which are released from the food material into the frying oil during frying, are sunken into the lower oil tank 1*b* and collected in the lower oil tank 1*b*. Accordingly, the bottom of the lower oil tank 1*b*, that is, the bottom of the oil tank 1 is inclined, and thus the sunken fried scraps are naturally accumulated at a lowermost portion of the lower oil tank 1*b*.

A void 43 for air-cooling the oil tank 1 is defined between the housing 4 and the oil tank 1. Further, air inlets 44 are formed in the bottom of the housing 4, whereas air outlets 45 are formed in vicinities of an upper end of the housing 4. When the frying oil 2 in the oil tank 1 has high temperature, an atmosphere in the void 43 moves up the void 43 by being heated by the oil tank 1, and then is discharged through the air outlets 45 to the outside of the housing 4. Meanwhile, an atmosphere outside the housing 4 is taken into the void 43 through the air inlets 44. Thus, the oil tank 1 is air-cooled successively. However, the upper oil tank 1*a* is surrounded by a heat insulating material 42, and only the lower oil tank 1*b* is cooled by the atmosphere in the void 43. That is, when the frying oil 2 in the upper oil tank 1*a* is heated by the heaters 3, only the frying oil 2 in the upper oil tank 1*a* is kept at high temperature. Meanwhile, the frying oil 2 in the lower oil tank 1*b* is actively cooled and kept at a temperature lower than that in the upper oil tank 1*a*.

As the heaters 3, two kinds of heaters, that is, a lower heater 3*a* and a side heater 3*b* are provided. The side heater 3*b* surrounds a cooking area 5 (area surrounded by the alternate long and short dash line in FIG. 1) for the food material in the upper oil tank 1*a*, whereas the lower heater 3*a* is provided at the bottom of the cooking area 5.

Figure 2:
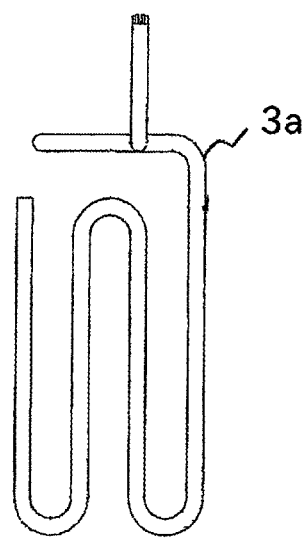
FIG. 2 is a plan view for illustrating an example of a lower heater to be used in the fryer according to the first embodiment.
Figure 3:
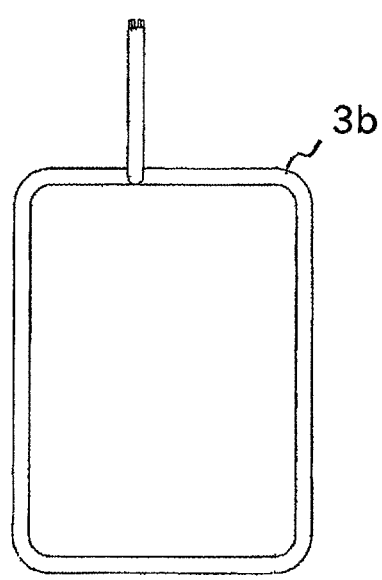
FIG. 3 is a plan view for illustrating an example of a side heater to be used in the fryer according to the first embodiment.

FIG. 2 is a plan view for illustrating the lower heater 3*a*. The lower heater 3*a* is a so-called sheath heater including an electrical insulating material and a nichrome wire sheathed in a stainless sheath pipe. The lower heater 3*a* is repeatedly bent at predetermined intervals, and extends horizontally in the oil tank 1. Further, FIG. 3 is a plan view for illustrating the side heater 3*b*. The side heater 3*b* is a sheath heater similar to the lower heater 3*a*. The side heater 3*b* is bent into a rectangular shape so as to surround a predetermined section in the upper oil tank 1*a*, and forms a multilevel overlap in a depth direction of the oil tank 1 as illustrated in FIG. 1. The lower heater 3*a* and the side heater 3*b* are provided in the oil tank 1 in a flip-up manner or freely removable manner. When the frying oil 2 in the oil tank 1 is to be replaced or an inside of the oil tank 1 is to be cleaned, the heaters 3 can be retreated from the inside of the oil tank 1.

Figure 4:
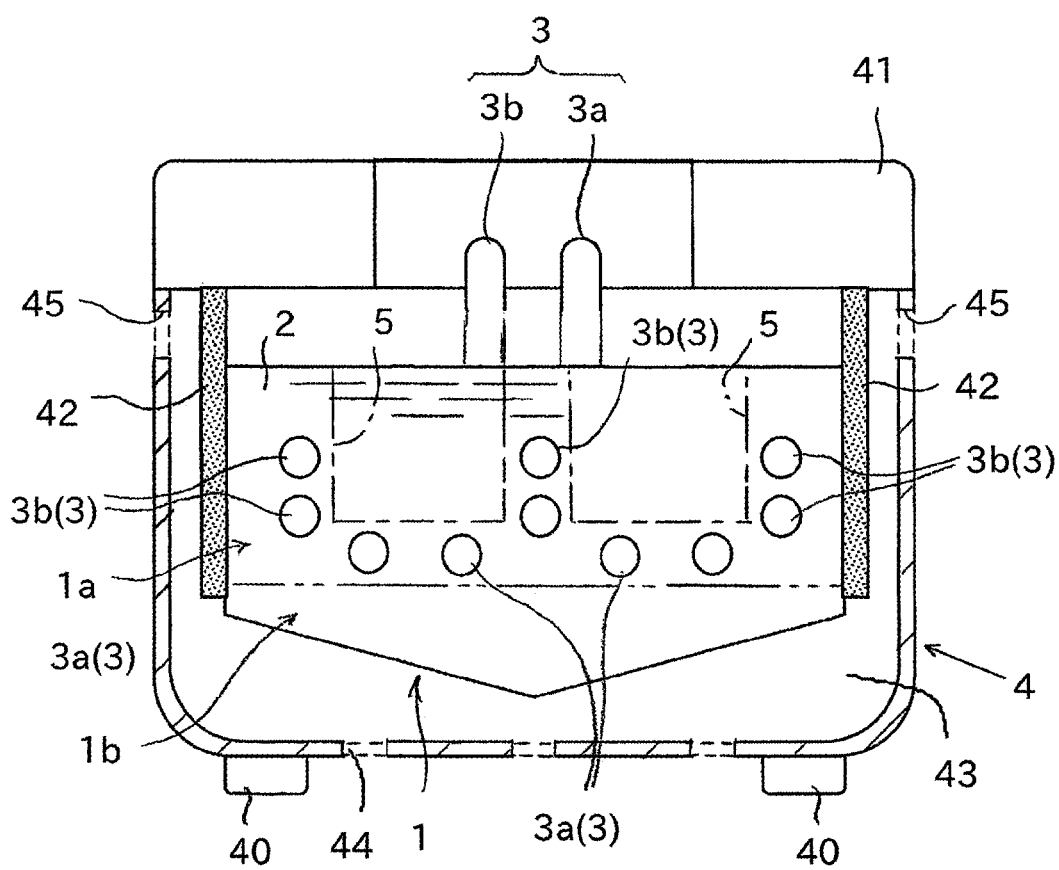
FIG. 4 is a sectional view for illustrating an example in which an upper oil tank is divided into two cooking areas by the side heater.

In the upper oil tank 1*a*, the area surrounded by the lower heater 3*a* and the side heater 3*b* corresponds to the cooking area 5 for the food material. That is, in frying performed using the fryer, the food material is put into the pocket-shaped cooking area 5 surrounded by the heaters 3. The side heater 3*b* is arranged around the cooking area 5, whereas the lower heater 3*a* is arranged below the cooking area 5. With this arrangement, the frying oil 2 in the cooking area 5 can be heated from a periphery of the cooking area 5. In the example illustrated in FIG. 1, only one cooking area 5 is provided in the upper oil tank 1*a*. However, for example, as illustrated in FIG. 4, an inside of the upper oil tank 1*a* may be divided into a plurality of cooking areas 5*a* and 5*b*, and the side heater 3*b* may be arranged so as to surround the cooking areas.

The operation unit 41 may include independent switches provided for energization to the lower heater 3*a* and energization to the side heater 3*b*, respectively. A user who uses the fryer may perform on/off operation on the switches. However, in view of performing frying at constant temperature, it is preferred that a temperature of the frying oil 2 in the upper oil tank 1*a* be detected by a temperature sensor (not shown) at predetermined time intervals, and that output of the lower heater 3*a* and output of the side heater 3*b* be controlled based on the detection results. Further, as in an embodiment to be described later, the output of the lower heater 3*a* and the output of the side heater 3*b* may be controlled in consideration of whether or not the food material is put into the oil tank 1.

In the fryer illustrated in FIG. 1, as each of the lower heater 3*a* and the side heater 3*b*, the sheath heater having a circular sectional shape is used. However, a sheath heater applicable to the fryer according to the present invention is not limited thereto. For example, a sheath heater including a sheath pipe having a flat band shape may be used as the side heater 3*b*. Further, with regard to the side heater 3*b*, a coil for induction heating may be arranged outside a peripheral wall of the upper oil tank 1*a* so that the peripheral wall of the upper oil tank 1*a* itself generates heat to heat the frying oil.

In the fryer according to the first embodiment, the food material is put into the cooking area 5 surrounded by the lower heater 3*a* and the side heater 3*b*, and then the food material is fried. At the beginning of putting-in of the food material, a large amount of moisture is released from the food material into the frying oil. In particular, in a case of putting-in of the food material such as frozen food or vegetables from which water is strained off, an extremely large amount of moisture is released into the frying oil. When the moisture is heated by the frying oil and then vaporized, large amounts of air bubbles are formed in the frying oil, and the air bubbles burst on an oil surface, thereby causing a large amount of oil spatter. In addition, deterioration of the frying oil due to oxidation is accelerated.

Meanwhile, according to confirmation elicited by the inventor of the subject application through experiments, when comparison is made between a case of frying the food material in the vicinity of the oil surface of the frying oil and a case of frying the food material at a position at which the food material is deeply immersed in the frying oil, even though the same food material is put into the frying oil, it is confirmed that in the latter case, formation of the air bubbles in the frying oil is suppressed, and oil spatter on the oil surface is less liable to occur. With regard to this point, in the fryer according to the first embodiment to which the present invention is applied, the side heater 3b surrounding the cooking area 5 is provided in the upper oil tank 1a, and the cooking area 5 is formed into a pocket shape. Thus, the food material can be fried not in the vicinity of the oil surface, but at the position at which the food material is deeply immersed in the cooking area 5. Accordingly, when the fryer is used, formation of the air bubbles in the frying oil at the beginning of putting-in of the food material is suppressed, thereby being capable of suppressing oil spatter on the oil surface and acceleration of deterioration of the frying oil 2.

Figure 5:
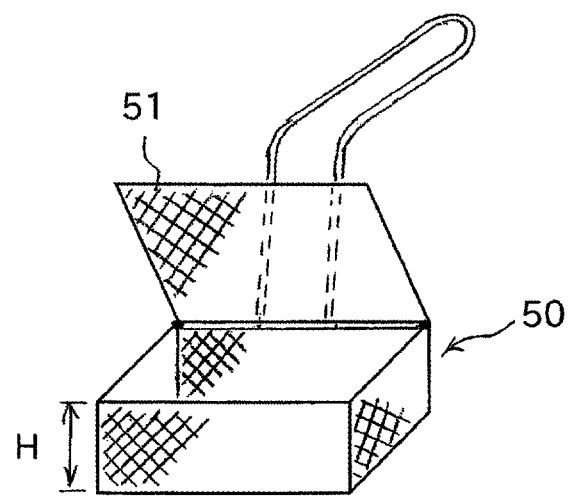
FIG. 5 is a perspective view for illustrating an example of a frying basket applicable to the fryer according to the first embodiment.

Further, in order to perform cooking under a state in which the food material is deeply immersed in the cooking area 5, for example, a frying basket 50 with a lid as illustrated in FIG. 5 can be used. The frying basket 50 has a size capable of being received in the cooking area 5 without interference with the side heater 3b, and includes a lid 51 provided on an upper portion of the frying basket 50 in a freely openable and closable manner. Further, a height H of the frying basket 50 is set smaller than a depth from the oil surface in the oil tank to the lower heater 3a. Thus, when the food material is put into the frying basket 50, and then the food material is cooked under a state in which the frying basket 50 is immersed in the frying oil 2 in the cooking area 5, the lid 51 prevents the food material from rising. Accordingly, the food material can be cooked under a state in which the food material is forcibly immersed in the cooking area. Therefore, through combined use of the fryer and the frying basket 50, oil spatter on the oil surface and acceleration of deterioration of the frying oil 2 can be further suppressed.

Further, the moisture released in the cooking area 5 from the food material into the frying oil 2 is sunken in the oil tank 1 due to a difference in specific gravity from the frying oil 2. When the moisture is quickly sunken from the upper oil tank 1a kept at high temperature into the lower oil tank 1b kept at low temperature, vaporization of the moisture can be suppressed, thereby being capable of suppressing oil spatter on the oil surface. However, when the lower heater 3a is provided below the cooking area 5, the moisture is required to pass through a periphery of the lower heater 3a in the process of being sunken from the upper oil tank 1a into the lower oil tank 1b, and the moisture is easily vaporized under heat generation of the lower heater 3a.

With regard to this point, in the fryer according to the first embodiment to which the present invention is applied, the frying oil 2 in the cooking area 5 is heated by both the lower heater 3a and the side heater 3b. Thus, as compared to a case in which the frying oil 2 in the upper oil tank 1a is heated by only the lower heater 3a, power to be supplied to the lower heater 3a can be set lower. Accordingly, the moisture released in the cooking area 5 from the food material into the frying oil 2 is less liable to be vaporized when passing through the lower heater 3a and being sunken, and hence the moisture is easily sunken into the lower oil tank 1b. With this, oil spatter on the oil surface can be suppressed.

Moreover, in the frying oil 2 in the upper oil tank 1a, convection is caused due to heating performed by the side heater 3b, and the frying oil 2 present in the vicinity of the side heater 3b is heated to high temperature and ascends toward the oil surface. Meanwhile, the frying oil 2 in the vicinity of the oil surface descends in the upper oil tank 1a at a center of the cooking area 5. This phenomenon is conspicuous when the power to be supplied to the side heater is set higher than the power to be supplied to the lower heater. Thus, the moisture and the fried scraps released in the cooking area 5 from the food material into the frying oil 2 are easily sunken toward the lower oil tank 1b, and the moisture is sunken into the lower oil tank 1b as quickly as possible. Accordingly, vaporization of the moisture can be prevented, and occurrence of oil spatter on the oil surface can be suppressed.

Figure 6:
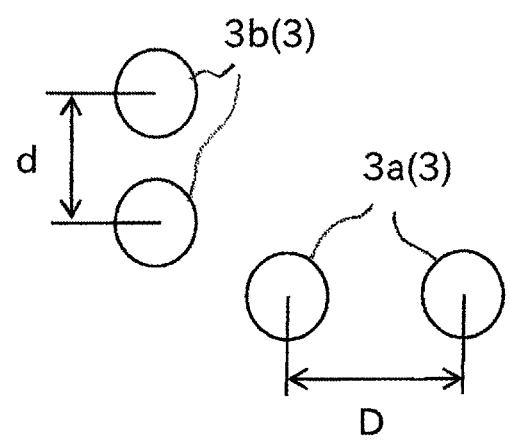
FIG. 6 is a schematic view for illustrating comparison between an arrangement distance between the lower heater and the side heater.

In view of suppressing vaporization of the moisture released in the cooking area 5 from the food material into the frying oil 2, as illustrated in FIG. 6, it is preferred that a distance D between sheath pipe portions of the lower heater 3a be larger than a distance "d" between sheath pipe portions of the side heater 3b. In a case in which the distance D between the sheath pipe portions of the lower heater 3a is set to a large size as described above, when the moisture in the frying oil 2 passes through a gap of the lower heater 3a and is sunken from the upper oil tank 1a into the lower oil tank 1b, there is reduced a risk in that the moisture is heated by the lower heater 3a and vaporized, thereby being capable of suppressing occurrence of oil spatter and oxidation of the frying oil.

Figure 7:
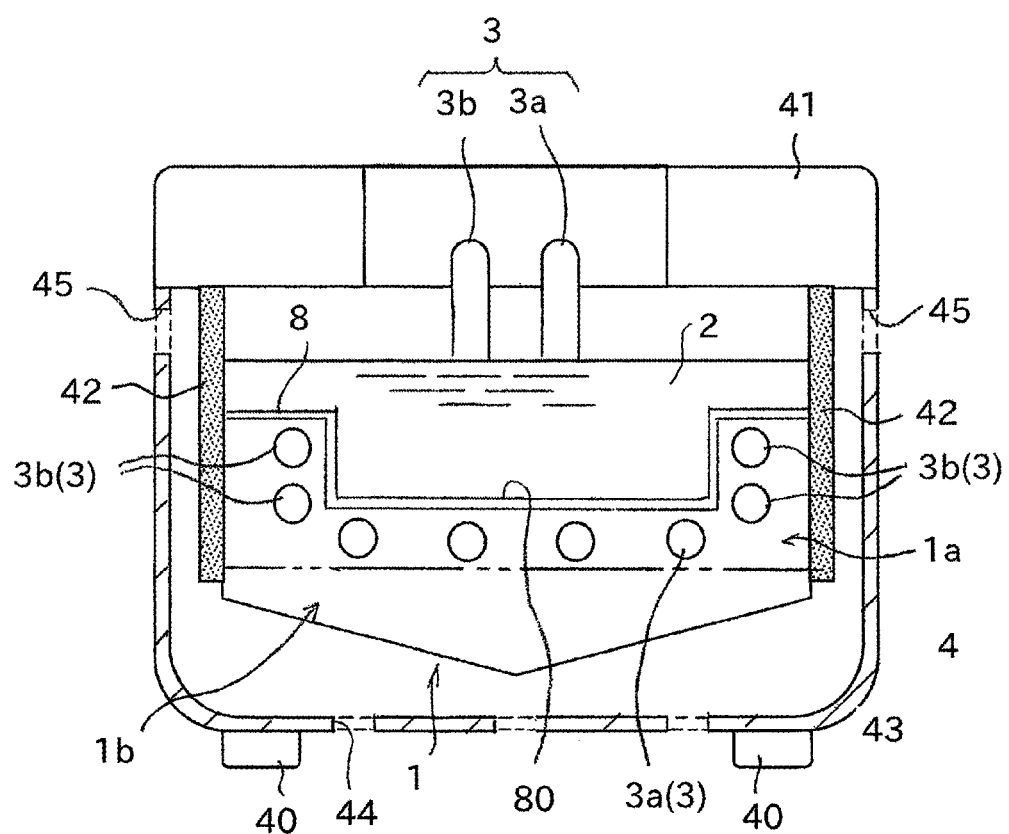
FIG. 7 is a sectional view for illustrating a fryer according to a second embodiment to which the present invention is applied.

FIG. 7 is a view for illustrating a fryer according to a second embodiment to which the present invention is applied.

The fryer according to the second embodiment includes a fall prevention plate 8 provided inside the upper oil tank 1a so as to cover the lower heater 3a and the side heater 3b from above. The fall prevention plate 8 is configured to prevent the food material that is being fried from dropping down from the cooking area 5 into the lower oil tank 1b. The other components such as the housing, the oil tank, and the heaters are the same as those in the first embodiment described above, and hence are denoted in FIG. 7 by the same reference symbols as those in the first embodiment. Here, detailed description thereof is omitted.

The fall prevention plate 8 is formed into a shape capable of being received inside the oil tank 1. The fall prevention plate 8 is locked to a predetermined position in the oil tank by being supported by the lower heater and the side heater, and partitions the inside of the oil tank 1 into upper and lower sections. The fall prevention plate 8 is formed by bending a metal plate having a large number of pores. With this configuration, the frying oil 2 flows between upper and lower sides of the fall prevention plate 8 through the large number of pores.

Further, the fall prevention plate 8 includes a recessed portion 80 formed in a center thereof. The recessed portion 80 corresponds to the cooking area 5 in the upper oil tank 1a. When the fall prevention plate 8 is arranged in the oil tank 1, the recessed portion 80 is fitted on an inner side of the side heater 3b and covers the lower heater 3a from above, and the fall prevention plate 8 separates the heaters 3a and 3b from the cooking area 5.

As described above in the first embodiment, the food material put into the oil tank 1 is immersed in the cooking area 5 surrounded by the side heater 3b, and frying is performed in the cooking area 5. At the beginning of putting-in of the food material, there is a high risk in that a large amount of moisture released from the food material is vaporized in the frying oil 2 to cause formation of large amounts of air bubbles so that the frying oil in the upper oil tank 1a is sharply agitated. However, even if the frying oil is sharply agitated, the frying oil 2 is gently circulated between the upper oil tank 1a and the lower oil tank 1b owing to the large number of pores formed in the fall prevention plate 8. That is, when the fall prevention plate 8 is provided, the high-temperature frying oil in the upper oil tank 1a can be prevented from being sharply agitated together with the low-temperature frying oil in the lower oil tank 1b. Thus, the moisture sunken in the lower oil tank 1b is prevented from rising again and being vaporized, thereby being capable of suppressing oil spatter on the oil surface in the oil tank 1. Therefore, in the fryer according to the second embodiment, when frying the food material having a relatively large amount of moisture, such as frozen food covered with frost or vegetables from which water is dewatered, oil spatter and deterioration of the frying oil can be more actively suppressed as compared to the fryer according to the first embodiment described above.

Figure 8:
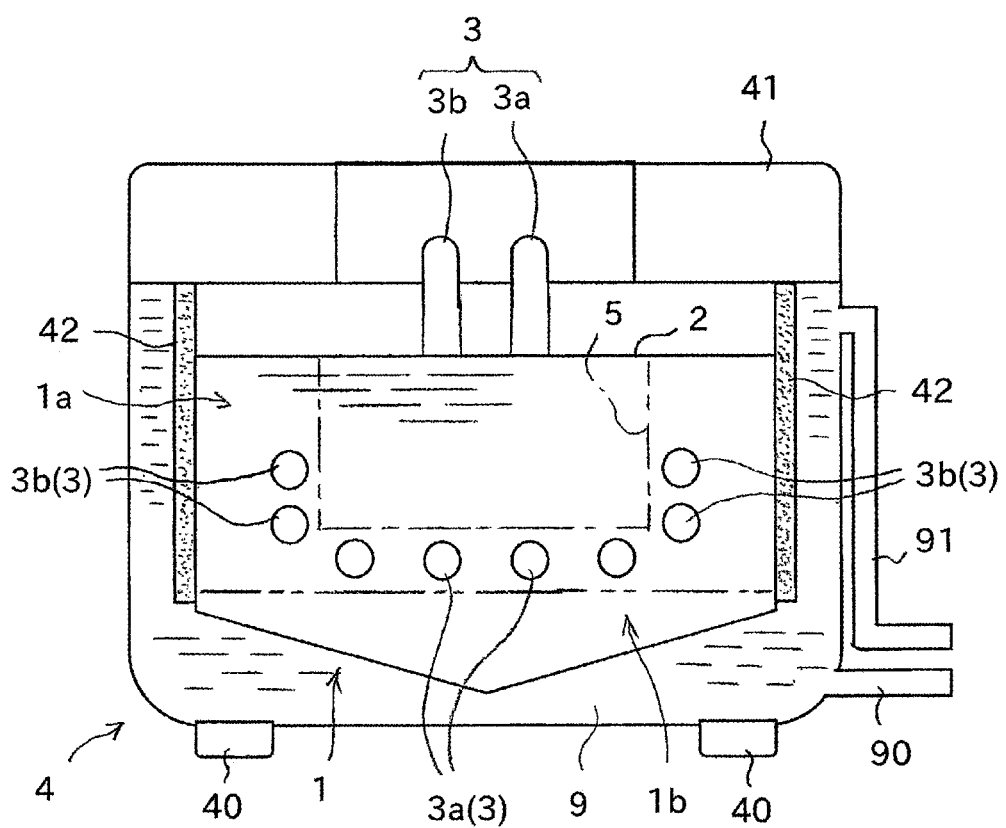
FIG. 8 is a sectional view for illustrating a fryer according to a third embodiment to which the present invention is applied.

FIG. 8 is a view for illustrating a fryer according to a third embodiment to which the present invention is applied.

The fryer according to the third embodiment includes a water tank 9 provided in the housing 4 as a cooling jacket, and water is filled into the water tank 9. With this configuration, the oil tank 1 is cooled from a periphery of the oil tank 1. However, the heat insulating material 42 is provided between the upper oil tank 1a and the water tank 9. Thus, the high-temperature frying oil in the upper oil tank 1a is prevented from being cooled by water in the water tank 9, and only the frying oil in the lower oil tank 1b is cooled by water in the water tank 9. The other components such as the housing, the oil tank, and the heaters are the same as those in the first embodiment described above, and hence are denoted in FIG. 8 by the same reference symbols as those in the first embodiment. Here, detailed description thereof is omitted.

A water filling pipe 90 for filling water into the water tank 9 is connected to the water tank in the vicinity of the bottom of the housing 4, whereas a water discharge pipe 91 for discharging water from the water tank 9 is connected to the water tank 9 in the vicinity of the upper end of the housing 4. Water in the water tank 9 cools the frying oil 2 in the oil tank 1. Thus, the temperature of water in the water tank 9 is the highest in the vicinity of the upper end of the housing 4, and the temperature of water in the water tank 9 is the lowest in the vicinity of the bottom of the housing 4. Accordingly, the low-temperature water is filled into the water tank 9 in the vicinity of the bottom of the housing 4 from an outside of the water tank 9, and the high-temperature water in the water tank 9 is discharged from the vicinity of the upper end of the housing 4, thereby being capable of cooling the frying oil 2 in the lower oil tank 1b while controlling a water filling amount into the water tank 9.

In the fryer according to the third embodiment, the frying oil 2 in the lower oil tank 1b can be actively cooled from the outside by water in the water tank 9. For example, even when the temperature of the oil in the upper oil tank 1a is heated to about 180° C. through energization to the lower heater 3a and the side heater 3b, the temperature of the oil in the lower oil tank 1b can be kept at about 80° C. Thus, once the moisture released from the food material in the upper oil tank 1a passes through the lower heater 3a and reaches the lower oil tank 1b, there is significantly reduced a risk in that the moisture is vaporized through heating.

Further, as described above in the first embodiment and the second embodiment, in the fryer according to the present invention, measures are taken in order to cause the moisture released into the frying oil 2 in the upper oil tank 1a to reach the lower oil tank 1b without being vaporized, thereby being capable of increasing probability that the moisture reaches the lower oil tank 1b as it is.

Therefore, in the fryer according to the third embodiment, the moisture and the fried scraps released in the cooking area 5 from the food material into the frying oil 2 can be sunken into the lower oil tank 1b as quickly as possible, and can be retained in the lower oil tank 1b as they are. Thus, oil spatter on the oil surface caused by vaporization of the moisture, and deterioration of the frying oil due to oxidation can be effectively suppressed.

Next, description is made of a fryer according to a fourth embodiment to which the present invention is applied.

Figure 9:
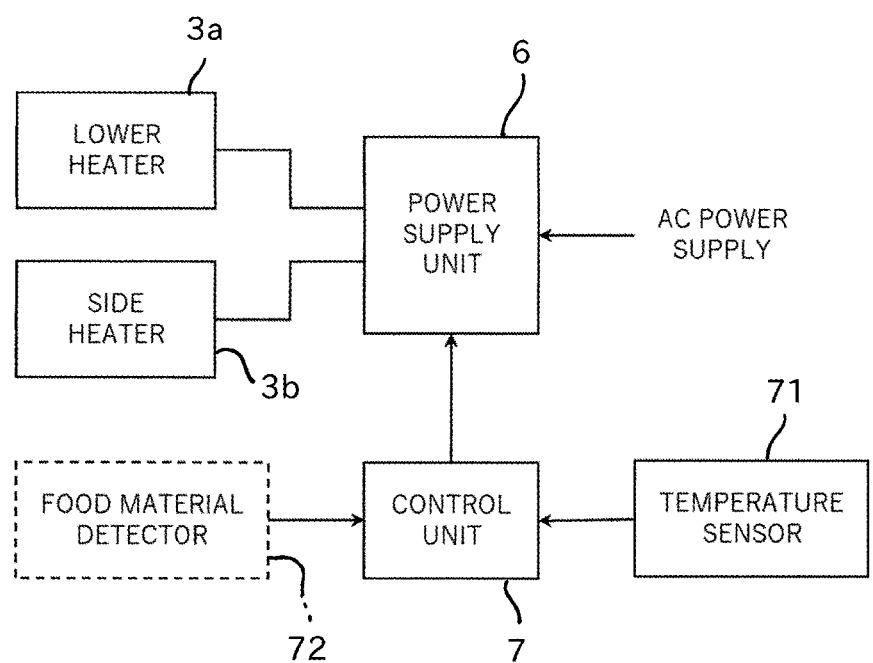
FIG. 9 is a block diagram for illustrating an example of a control system for the heaters of the fryer to which the present invention is applied.

In the fourth embodiment, an example of control of the lower heater and the side heater is described. FIG. 9 is a block diagram for illustrating a control system for the lower heater 3a and the side heater 3b. The lower heater 3a and the side heater 3b are connected to a power supply unit 6 to which power is supplied from an AC power supply, and the lower heater 3a and the side heater 3b generate heat through energization from the power supply unit 6. The power supply unit 6 is controlled by a control unit 7 including a microprocessor. A temperature sensor 71 configured to measure the temperature of the frying oil 2 is provided in the oil tank 1. While making reference to signals output from the temperature sensor 71 at predetermined time intervals, the control unit 7 gives an instruction to the power supply unit 6 about power to be supplied to the lower heater 3a and the side heater 3b based on a program stored in advance so as to keep the frying oil in the upper oil tank 1a at a predetermined temperature (for example, at 180° C.)

The program stored in the control unit 7 may be freely selected. For example, based on the signal output from the temperature sensor 71, energization to the lower heater 3a and the side heater 3b may be turned on/off through proportional control, or power supply to the lower heater 3a and the side heater 3b may be controlled through PID control. Further, in accordance with a change in temperature of the frying oil 2, a differential may be set between power to be supplied to the lower heater 3a and power to be supplied to the side heater 3b.

Further, at the beginning of putting the food material into the high-temperature frying oil 2, a large amount of moisture is released from the food material into the frying oil 2. Accordingly, in view of sinking the moisture into the lower oil tank 1b without vaporizing the moisture, it is also effective to reduce the output of the lower heater 3a for a predetermined time period after putting-in of the food material as compared to the output before putting-in of the food material. That is, in a case in which it is assumed that a large amount of moisture is present in the frying oil in the upper oil tank 1a even when the temperature of the oil in the upper oil tank 1a is decreased due to putting-in of the food material, such control is carried out as to increase only power to be supplied to the side heater 3b without increasing power to be supplied to the lower heater 3a.

The control unit 7 checks a signal output from a food material detector 72, and determines whether or not the food material is put into the oil tank. As the food material detector 72, for example, a level sensor configured to detect an oil level in the oil tank 1 may be provided, and it may be determined based on a change in signal output from the level sensor whether or not the food material is put into the oil tank. Alternatively, an optical sensor may be provided at an opening portion of the oil tank 1, and passage of the food material may be directly detected based on a change in signal output from the optical sensor. Further, when the food material is put into the oil tank 1, the temperature of the frying oil 2 rapidly decreases. Thus, also based on a change in signal output from the temperature sensor 71, it can be determined whether or not the food material is put into the oil tank. With this configuration, the temperature sensor 71 can also be used as the food material detector 72.

FIG. 10 is a flowchart for illustrating an example of an energization control program for the lower heater 3a and the side heater 3b. When the main power switch provided on the housing 4 is turned on, the control unit 7 starts the energization control program for the lower heater 3a and the side heater 3b. The control unit 7 reads the signal output from the temperature sensor 71, for example, every second, carries out the PID control in accordance with a predetermined parameter, and sends, to the power supply unit 6, a signal for controlling power supply to the lower heater 3a and the side heater 3b (Step ST1). In response to the control signal, the power supply unit 6 performs energization to the lower heater 3a and the side heater 3b. In this manner, the temperature of the frying oil 2 in the upper oil tank 1a is controlled to a set temperature selected by a user.

Meanwhile, when the food material is put into the cooking area 5 in the upper oil tank 1a along with start of frying, the temperature of the oil in the upper oil tank 1a rapidly decreases. The control unit 7 reads the signal output from the temperature sensor 71, and checks whether or not a decreasing rate of the temperature of the oil in the upper oil tank 1a (cooking area 5) is equal to or larger than a predetermined value (Step ST2). When the decreasing rate of the temperature of the oil is smaller than the predetermined value, the control unit 7 continues the PID control based on the signal output from the temperature sensor 71 (Step ST1). When the decreasing rate of the temperature of the oil is equal to or larger than the predetermined value, it can be determined that the food material is put into the cooking area 5 so that the temperature of the oil decreases. In this case, irrespective of the above-mentioned PID control, energization to the lower heater 3a is forcibly reduced for only a predetermined time period (for example, sixty minutes) (Step ST3). That is, when the food material is put into the oil tank so that the temperature of the oil in the cooking area 5 decreases, the output of the side heater 3b is increased so as to obtain a larger amount of heat generation. However, the output of the lower heater 3a is maintained to the same level as that immediately before putting-in of the food material, or the output of the lower heater 3a is reduced as compared to that immediately before putting-in of the food material, thereby suppressing increase in temperature of the oil in the periphery of the lower heater 3a.

At the beginning of putting the food material into the cooking area in the upper oil tank 1a, a large amount of moisture is released from the food material into the frying oil. When energization to the lower heater 3a is performed before the large amount of moisture is sunken into the lower oil tank 1b, the moisture that is being sunken from the upper oil tank 1a into the lower oil tank 1b is heated by the lower heater 3a and thus vaporized in the oil. By an amount of vaporized moisture, a large amount of oil spatter occurs on the oil surface, and deterioration of the frying oil 2 in the oil tank 1 is accelerated. Further, when large amounts of air bubbles are formed in the vicinity of a boundary between the upper oil tank 1a and the lower oil tank 1b, the fried scraps that are being sunken into the lower oil tank 1b also rise in the upper oil tank 1a.

Therefore, when it is determined that the food material is put into the cooking area 5, for only an assumable time period within which a large amount of moisture released from the food material into the oil passes through the vicinity of the lower heater 3a and reaches the lower oil tank 1b, energization to the lower heater 3a is forcibly turned off. In this manner, vaporization of the moisture in the vicinity of the lower heater 3a is suppressed, thereby being capable of suppressing oil spatter on the oil surface and deterioration of the frying oil 2.

After a predetermined time period elapses from the start of forcible reduction of energization to the lower heater 3a, the control unit 7 checks whether or not the main power switch is turned off (Step ST4), and continues, until disconnection of the main power switch, the PID control in a manner similar to that performed when the main power switch is turned on so as to control the output of the lower heater 3a and the output of the side heater 3b (Step ST1). Further, when the main power switch is turned off, the energization control program for the lower heater 3a and the side heater 3b is finished.

Through such energization control for the lower heater 3a and the side heater 3b, there can be quickened the sinking of, into the lower oil tank 1b, the moisture and the fried scraps released from the food material into the frying oil 2, thereby suppressing oil spatter on the oil surface and deterioration of the frying oil 2.

The invention claimed is:

1. A fryer, comprising:
an oil tank; and
a heater, the fryer being configured to heat a frying oil stored in the oil tank by the heater so as to fry a food material put into the oil tank,
the oil tank including
an upper oil tank in which the heater is arranged and the food material is to be fried, and
a lower oil tank provided below the upper oil tank so as to be continuous with the upper oil tank, and configured to sink and collect moisture and fried scraps released from the food material into the upper oil tank,
the heater including
a side heater partitioning an inside of the upper oil tank into one or a plurality of cooking areas, and surrounding the one or the plurality of cooking areas, and a lower heater provided at a bottom of the one or the plurality of cooking areas,
wherein the power to be supplied to the side heater is set higher than the power to be supplied to the lower heater,
the fryer further comprising:
a control unit configured to control energization to the side heater and the lower heater so as to keep the frying oil in the upper oil tank at a predetermined temperature; and
a food material detector configured to determine whether or not the food material is put into the upper oil tank,
wherein when the food material detector determines that the food material is put into the upper oil tank, the control unit reduces output of the lower heater as compared to the output before the determination for only a predetermined time period after the determination.

2. The fryer according to claim 1, wherein the food material detector determines that the food material is put into the upper oil tank when a decreasing rate of a temperature of the frying oil in the upper oil tank exceeds a predetermined value.

\* \* \* \* \*